(12) United States Patent
Wyne

(10) Patent No.: US 6,637,678 B2
(45) Date of Patent: Oct. 28, 2003

(54) GRANULAR MATERIAL SPREADER ATTACHMENT FOR MOWER OR OTHER APPARATUS

(76) Inventor: Mark W. Wyne, 2667 Christy Ave., Wildwood, MO (US) 63040

(*) Notice: Subject to any disclaimer, the term of this patent is extended or adjusted under 35 U.S.C. 154(b) by 0 days.

(21) Appl. No.: 10/144,869

(22) Filed: May 13, 2002

(65) Prior Publication Data

US 2002/0175230 A1 Nov. 28, 2002

Related U.S. Application Data

(63) Continuation-in-part of application No. 09/480,575, filed on Jan. 10, 2000, which is a continuation-in-part of application No. 09/175,043, filed on Oct. 19, 1998, now abandoned.
(60) Provisional application No. 60/290,607, filed on May 14, 2001, and provisional application No. 60/061,895, filed on Oct. 14, 1997.

(51) Int. Cl.$^7$ .............................. E01C 19/20; A01C 3/06
(52) U.S. Cl. ...................... 239/663; 239/650; 239/661; 239/681; 239/683
(58) Field of Search .................................. 239/650, 661, 239/663, 664, 665, 666, 668, 681, 683

(56) References Cited

U.S. PATENT DOCUMENTS

| | | |
|---|---|---|
| 3,082,007 A | 3/1963 | Johnson |
| 3,523,648 A | 8/1970 | Garber |
| 3,982,697 A | 9/1976 | Maples |
| 4,063,748 A | 12/1977 | Schmidt |
| 4,289,256 A | 9/1981 | Bailey |
| 4,688,819 A | 8/1987 | Reilly et al. |
| 4,725,004 A | 2/1988 | Baran, Jr. |
| 4,744,580 A | 5/1988 | Ryan |
| 4,798,325 A | 1/1989 | Block |
| 5,106,002 A | 4/1992 | Smith et al. |
| 5,106,020 A | 4/1992 | Harrell |
| 5,190,218 A | 3/1993 | Kayser et al. |
| 5,195,308 A | 3/1993 | Grote et al. |
| 5,237,803 A | 8/1993 | Dominugue, Jr. |
| 5,375,773 A * | 12/1994 | Lewis ..................... 239/650 |
| 5,423,565 A | 6/1995 | Smith |
| 5,533,676 A | 7/1996 | Conley |
| 6,047,909 A | 4/2000 | Simpson |
| 6,089,478 A * | 7/2000 | Truan et al. ............. 239/661 |
| 6,422,490 B1 * | 7/2002 | Truan et al. ............. 239/663 |

* cited by examiner

Primary Examiner—Robin O. Evans
(74) Attorney, Agent, or Firm—Paul M. Denk

(57) ABSTRACT

A granular material spreader for a mower or other apparatus, including a support column, having a support plate attached to it's bottom, for supporting the spreader thereon, the spreader being mounted to the shaft of the motor which when energized, turns the spreader for usage. A bracket attaching to the support column supports the hopper, into which granular material may be deposited, the bottom of the hopper includes a series of apertures, and a control plate pivotally mounted to the underside of the hopper bottom, and which when pivoted, provides for a full or partial opening of the flow apertures in the hopper bottom, or their closure, as when granular material dispensing and spreading is curtailed. A pivot lever mounts onto a plate, further supported by the support column, the lever is pivoted through energization of the solenoid, to initiate the dispensing, or not, of the granular material. In addition, the control plate includes an adjustment nut, that allows for adjusting of the degree of pivot to the pivot link, regulating the amount of dispensing of granular material made from the hopper, and it's dissemination by means of the associated revolving spreader.

9 Claims, 1 Drawing Sheet

GRANULAR MATERIAL SPREADER ATTACHMENT FOR MOWER OR OTHER APPARATUS

CROSS REFERENCE TO RELATED APPLICATION

This application is a non provisional application based upon the provisional application filed on May 14, 2001, having Ser. No. 60/290,607; and this application is a continuation-in-part of the applicant's prior application having Ser. No. 09/480,575, filed on Jan. 10, 2000; which application is a continuation-in-part of the application having Ser. No. 09/175,043, filed on Oct. 19, 1998 now abandoned; and which application derives from the provisional patent application filed on Oct. 14, 1997, under Ser. No. 60/061,895, all of said applications being owned by the same applicant.

BACKGROUND OF THE INVENTION

There are a variety of various styles of lawn mowers and other apparatuses used both domestically, commercially, and for all facets of maintaining efficient lawn care, but predominately, most of the more durable type of riding mower arrangements are employed by the commercial lawn care organizations, and may include further and additional accessories, in the nature of spreaders, sprayers, and the like, for the processing and handling of complete lawn care during performance of such procedures. An example of apparatuses that may be utilized in conjunction with some type of a moveable vehicle, such as a lawn mower, spreader, roller, or the like, and which includes accessories for facilitating the further treatment of the lawn, such as with the spreading or spraying of fertilizer, herbicide, or the like, can be seen in a variety of prior art patents. For example, one such patent is shown in the U.S. patent to Maples, U.S. Pat. No. 3,982,697, which is upon a spraying apparatus, per se, which is attached to and used in conjunction with a mowing apparatus, as can be noted.

The patent to Harrell, U.S. Pat. No. 5,106,020, discloses another form of a spray attachment for lawn mowers.

The patent to Grote, et al., U.S. Pat. No. 5,195,308, shows a mower having fluid dispersion characteristics.

A further U.S. Pat. No. 5,237,803, to Domingue, Jr., shows a centrifugal combination sprayer/cutter apparatus.

The patent to Conley, U.S. Pat. No. 5,533,676, discloses a multi-purpose lawn care machine.

The patent to Garber, U.S. Pat. No. 3,523,648, is upon a broadcast spreader attachment for garden tractors.

The patent to Bailey, U.S. Pat. No. 4,289,256, discloses a tramlining device for seed drill.

The patent to Baran, Jr., U.S. Pat. No. 4,725,004, shows another form of a spray unit.

The patent to Block, U.S. Pat. No. 4,798,325, discloses a method and apparatus for applying liquid and dry lawn treatment materials.

The patent to Smith, et al., U.S. Pat. No. 5,106,002, shows a hitch mounted carrier assembly and method.

The patent to Kayser, et al., U.S. Pat. No. 5,190,218, shows another type of device for spraying liquids with a small tractor.

The current invention, on the other hand, provides an improved means for providing attachment for use upon a mower or other lawn care apparatus, and in particular automates the spreading of granular material, such as fertilizer, herbicide, insecticide, seed, or any other related type of material that needs dissemination, by means of a spreader, and in high volume over a large territory, in a minimum amount of time.

SUMMARY OF THE INVENTION

The principle of this invention is to provide means for furnishing stable mounting of a removable accessory to a mowing or spreading apparatus, generally of the riding type, or it may further be included upon the walk behind type of lawn care apparatus, so as to allow the lawn care worker to immediately place into operation a granular material spreader, simply upon the manipulation of a singular switch, to initiate such dissemination.

A further principle of this invention improves upon the structure and functionality of a fertilizer or other granular material spreader, of the type that is used in conjunction with a tractor, or riding mower, or even one which may be built into the structure of such an apparatus, so as to allow the operator to simply initiate the operations of the spreader, once installed, through the manipulation of a singular switch, either manually depressed by the hand or the foot, and which provides for both an opening and dispensing by the spreader, or to immediately cease such activity, upon this engagement of it's actuating switch.

This invention provides for the mounting of its various components to a support column, which may connect to the bracket mount normally associated with a lawn care apparatus, and to which attachments of this type may connect. The support column provides all the means for attachment of the various components that make up the spreader of this invention, including a base plate for attachment of the revolveable spreader, in addition to the motor that turns the same, the bracket for holding the granular material hopper in place, and the various operating components that provide for the quantity of material to be disseminated and spread, and limited to a full spreading, or only partial or minimum spreading, depending upon the type and functionality of the granular material being disseminated.

It is, therefore, the principle object of this invention to provide a granular material spreader for a mower that may be easily clamped on to the front or back hitch of a lawn care apparatus through a singular connection, and be immediately readied for use for spreading a variety of materials in the category of seed, fertilizer, herbicides, or any other type of granular material which requires dissemination.

Another object of this invention is to provide means for controlling the quantity of granular material being dispensed, automatically, through an adjustable setting.

Yet another object of this invention to provide for the close contact between the apertured plate, and the dispensing holes provided at the bottom of the hopper, so as to precisely control the amount of granular material being dispensed onto its associated spreader.

Still another object of this invention is to reduce and minimize the effort that must be employed by the serviceman, while utilizing a mowing or other related apparatus, allowing him/her to simply initiate the operations of, for example, the fertilizer spreader through a single actuation of an operating switch.

These and other objects may become more apparent to those skilled in the art upon reviewing the summary of the invention as provided herein, and upon undertaking a study of the description of it's preferred embodiment, in light of the drawings.

DESCRIPTION OF THE PREFERRED EMBODIMENT

Figure 1:
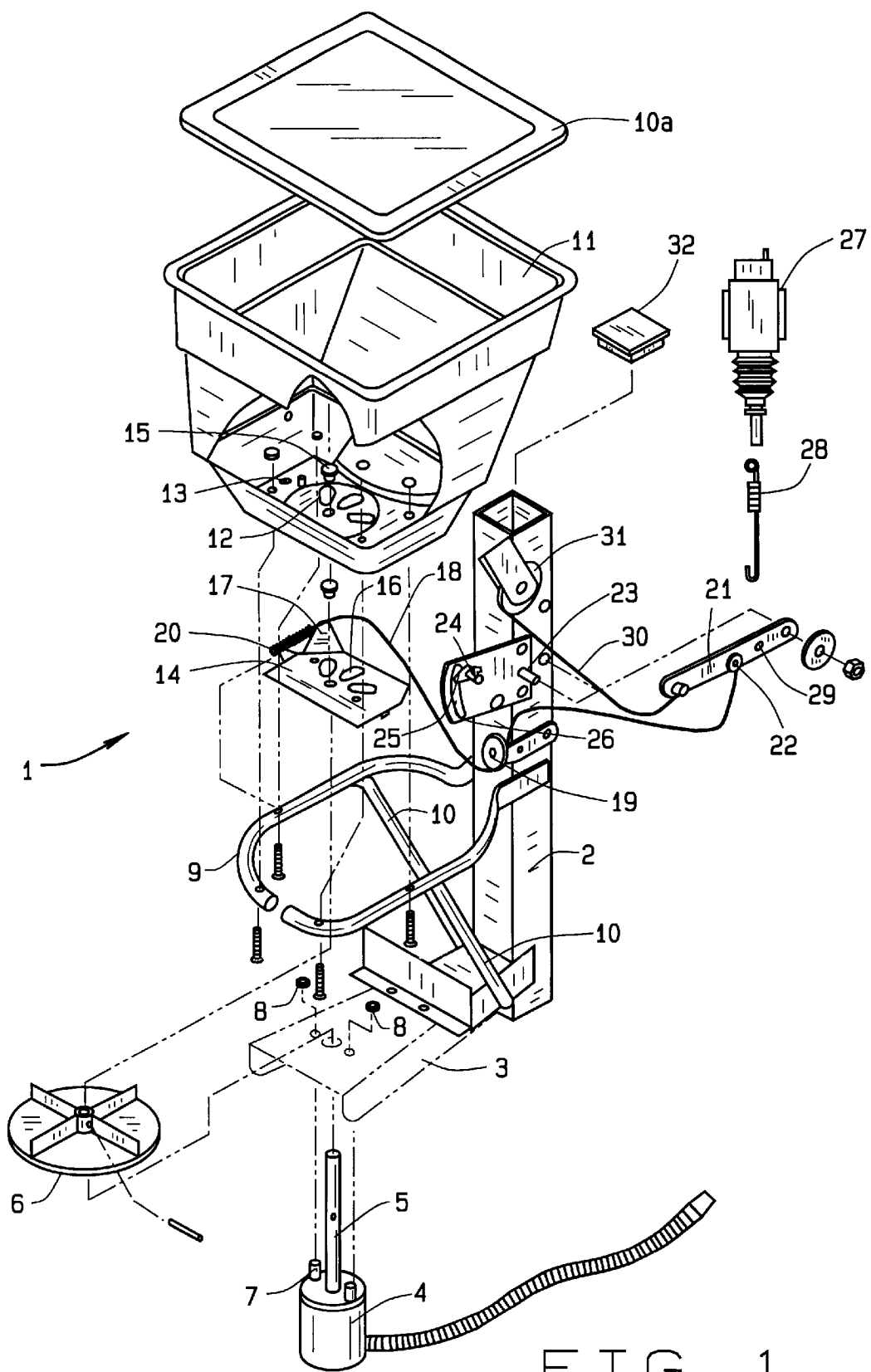
FIG. 1 is an exploded view of the granular material spreader for mower or other apparatus of this invention.

In referring to the drawing, an in particular FIG. 1, therein is shown the granular material dispenser 1 of this invention. Essentially, the primary support is provided by the support column 2, which at it's bottom, may include an angle column (not shown), which may secure with the bracket mount (not shown), normally provided at the front or back of a lawn care apparatus, such as a riding mower. Such a take off means is normally provided also upon a small tractor, which would allow the application of this spreader easily to such a device. Likewise, this spreader may be attached to a walk behind type of mower that has a similar type of takeoff connecting bracket secured with it, as known in the art. As an example, there are various types of riding or other forms of mowers that are manufactured and readily available from Earth Way Products, Inc., of Bristol, Ind.

The support column 2 includes, and has connected therewith, a base plate 3, which may be secured by a weld, bolts, or other means of connection, and extends forwardly thereof, as noted. The base plate includes reinforcing flanges, as can be seen, in order to provide further structural support, and strength, to this bracket, when employed in this manner. Connecting with the underside of the base plate 3 is the motor 4, whose shaft 5 extends upwardly, and has connected thereon the spreader 6 of the type as normally seen and employed in the trade. The motor can connect with the base plate by means of its bolts 7, secured in place by means of the fasteners 8, such as the nuts as shown.

Provided further upwardly upon the column support 2 is an embracing bracket 9, which likewise secures to either side of the support 2, and has a series of angulated brackets 10 extending upwardly therefrom, in order to provide full support, and the ability to withstand heavy downward pressures, that may be exerted upon the same by means of the hopper 11, which is supported by the brace 9, as can be understood. The hopper includes a cover 10a to allow for closure, of the interior of the hopper, once granular material, such as seed, or fertilizer, is applied therein.

The bottom of the hopper includes a series of aligned apertures, as at 12, which generally are arranged at equal radial distances from the approximate center of the hopper bottom 13, and while three such apertures are shown, more or less may be included. This provides the direct flow by gravity of any granular material deposited into the hopper downwardly, for impinging upon the rotating spreader 6, as can be understood.

To provide for control of the quantity of granular material being dispensed, a control plate 14 is pivotally secured by means of the pivot pin 15 to the bottom of the hopper, and the control plate includes a corresponding series of apertures 16 that normally close off the bottom of the hopper, unaligning themselves with the hopper apertures 12, but that when the control plate 14 is pivoted, and the apertures begin to align themselves, depending upon the degree of alignment, determines the amount of granular material to be dispensed downwardly from the hopper. The control plate includes an arm 17, extending off of one of it's corners, and a cable 18 connects therewith, and extends around a pulley 19, such that when the cable is pulled, the plate will pivot the various apertures into an opening condition, to allow for dispensing, but that when the cable is release or relaxed, the spring 20, which connects with the arm 17, and also by means of the fastener 21 to the brace 9, will pull the plate back into it's standard position, which normally closes off the bottom of the hopper, thereby preventing further material flow.

The control of the plate 14 through the cable 18 is undertaken by a pivotal lever 21. It can be seen that the cable 18 connects, at its opposite end, as at 22, to the said pivot lever. The pivot lever 21 connects by means of the pivot pin 23 to a lever support 24, and the extent of pivot of the lever 21, is regulated by means of the adjustment nut 25, which can be adjustably set within the slot 26, as can noted. A solenoid 27 connects by means of a link 28 to the aperture 29 of the pivotal link 21. Thus, when the solenoid is actuated, and the lever is pulled upwardly, it pulls upon the cable 18, pivoting the closure plate 14, to allow for some degree of alignment of the various apertures 12 and 16, as can be understood. The relative degree of opening between the apertures 12 and 16 is regulated by the extent of the pivot of the pivot link 21, controlled by the adjustment nut 25 that regulates the amount of pivot of the link relative to the setting of the nut 25 within its slot 26. And, when the solenoid is de-energized, and the pivot link 21 is allowed to drop, which may be achieved by any type of spring or other biasing action, or by gravity, the cable is relaxed, allowing the spring 20 to re-pivot the closure plate 14, thereby closing off the communication between the apertures 12 and 16, preventing the further flow of granular material.

The essence of this invention is to provide for the automatic control of the opening and closing of the control plate 14, through the manipulation of a single actuating control, or button, conveniently accessible to the operator, so that dispensing can be immediately initiated, or curtailed, by the operator. This is achieved through the usage of that control mechanism combining the solenoid 27, with the link means 28, which may comprise or incorporate a spring bias therein, which manipulates the pivot link 21, for tensioning or release of pressure upon the cable 18, that provides for that opening or closing of the alignment of the apertures 16, with respect to the hopper apertures 12, to some degree, depending upon the adjustment setting of the lever support 24, through the adjustment nut 25, as noted. It is this automation added to the structure and functionality of this granular material spreader attachment that greatly facilitates its usage when applied to a mower, or other apparatus, during usage.

Also provided upon the pivot link 21 is a further cable 30, looped around the pulley 31, which may allow for manual manipulation of the hopper openings, as can be understood.

The support column 2 also includes a closure cap, as at 32, to close off the top of the said column.

While the application as described herein, in the preferred embodiment, shows the usage of the solenoid being linked through a linking device, a pivotal link, a cable, through a spring, for actuation of the control plate, it is just as feasible, and likely, that the solenoid could be fabricated to connect onto some segment of the support column 2, or its lever support 24, and either connect directly to the control plate 14, or connect by means of any type of lever, or link rod, directly to the control plate 14, to provide for its actuation and pivot, and setting of the selected aperture(s) 16 in alignment with the bottom of the hopper, and its various apertures 12, to control the quantity and amount of granular material being dispensed, during operations of this granular material spreader.

Variations or modifications to the subject matter of this invention may occur to those skilled in the art upon reviewing the disclosure as provided herein. Such variations, or modifications, if within the conception of this development, are intended to be embodied within the scope of the invention as disclosed. The description of the preferred embodiment, as provided herein, is done so for illustrative purposes only.

I claim:

1. A granular material spreader for use in conjunction with and installation to lawn care apparatus including a lawnmower, riding mower, or other granular material spreading apparatus, comprising, a support column, said support column being rigidly connected to an apparatus, said support column generally extending vertically in relation to its installation, a base plate, said base plate connecting with the support column and extending forwardly thereof, said base plate provided for mounting of a motor, said motor incorporating a rotor shaft, a spreader connecting onto the rotor shaft of the motor and upon actuation of the motor providing for rapid rotation of said spreader;

a brace, said bracket connecting to the support column, and also extending forwardly thereof, a granular material hopper, said granular material hopper being supported by said brace, said granular material hopper having a bottom wall, said bottom wall incorporating a series of apertures therein, and provided for dispensing of the granular material during operating of said spreader;

a control plate, said control plate pivotally secured below and to the bottom hopper wall, said control plate including a series of apertures therethrough, and upon pivot of said control plate providing for alignment of one or more of the hopper bottom wall apertures with the control plate apertures to regulate the quantity of dispensing of granular material from the spreader during its operation;

a solenoid, said solenoid being operatively associated with the support column, and interconnecting with the control plate, such that upon actuation of the solenoid regulating the degree of pivot of the control plate to provide for control in the dispensing of the granular material from the spreader during its operation.

2. The granular material spreader of claim 1 wherein said solenoid connects to the support column.

3. The granular material spreader of claim 1 and including a link between the solenoid and the control plate to provide for actuation of the control plate upon energization of the said solenoid.

4. The granular material spreader of claim 3 wherein said link includes a pivot lever and cable to provide for pivot of the control plate during its actuation.

5. The granular material spreader of claim 3 wherein said link includes a link rod interconnecting between the solenoid and the control plate to provide for regulation in the degree of pivot of the control plate during actuation of the solenoid.

6. The granular material spreader of claim 3 wherein a lever interconnects between the solenoid and the control plate to provide for controlled pivot of the control plate during actuation of the solenoid to regulate the amount of granular material being dispensed by the spreader during its operation.

7. The granular material spreader of claim 3 and including a lever support, said lever support connecting to the column support, said solenoid being connected with the lever support and when energized providing for regulating the degree of pivot to the control plate to regulate the quantity of granular material being dispensed by the spreader.

8. The granular material spreader of claim 7 wherein the solenoid interconnects by one of a cable, lever, and link with the control plate when regulating the degree of pivot of the control plate for regulating the quantity of granular material being dispensed by the spreader.

9. The granular material spreader of claim 7 wherein said pivotal lever connecting to the lever support, said lever support including a slot and adjustment nut therein, the adjustment of the adjustment nut within the slot of the lever support regulating the degree of pivot to the control plate and alignment of select apertures to regulate the quantity of granular material being dispensed by the spreader upon energization of its motor and said solenoid.

* * * * *